US010066707B2

(12) United States Patent
Watanabe et al.

(10) Patent No.: US 10,066,707 B2
(45) Date of Patent: Sep. 4, 2018

(54) TENSIONER

(71) Applicant: TSUBAKIMOTO CHAIN CO., Osaka-shi, Osaka (JP)

(72) Inventors: Masanori Watanabe, Osaka (JP); Kohei Kunimatsu, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 89 days.

(21) Appl. No.: 15/351,642

(22) Filed: Nov. 15, 2016

(65) Prior Publication Data
US 2017/0146099 A1 May 25, 2017

(30) Foreign Application Priority Data

Nov. 25, 2015 (JP) .................. 2015-229808

(51) Int. Cl.
F16H 7/08 (2006.01)

(52) U.S. Cl.
CPC ....... F16H 7/08 (2013.01); F16H 2007/0806 (2013.01); F16H 2007/0814 (2013.01); F16H 2007/0859 (2013.01)

(58) Field of Classification Search
CPC ............... F16H 7/08; F16H 2007/0806; F16H 2007/0814; F16H 2007/0859
See application file for complete search history.

(56) References Cited

U.S. PATENT DOCUMENTS 5,346,436 A     9/1994  Hunter et al.
5,776,024 A *   7/1998  White ................. F16H 7/08
                                              474/101
5,989,139 A *  11/1999  Dusinberre, II ..... F16H 7/08
                                              474/110
5,993,342 A *  11/1999  Wigsten ............. F16H 7/08
                                              474/110
6,120,402 A *   9/2000  Preston ............. F16H 7/08
                                              474/109
6,322,468 B1 * 11/2001  Wing ............... F16H 7/08
                                              474/109

(Continued)

FOREIGN PATENT DOCUMENTS

EP      1323948 A1    7/2003
JP    7-158703 A      6/1995

(Continued)

Primary Examiner — Michael R Mansen
Assistant Examiner — Robert T Reese
(74) Attorney, Agent, or Firm — Westerman, Hattori, Daniels & Adrian, LLP

(57) ABSTRACT

Provided, is a simple-structured tensioner that can. favorably expel the air that has entered an oil pressure chamber, while enabling a reduction in size in the axial direction, and in processing and assembling workload. The tensioner 10 includes a relief mechanism made up of a relief hole 22 and a disc-like orifice member 60. A first main surface 61 of the orifice member 60 is provided with an outer circumferential annular groove 61a formed along an outer peripheral edge and a communication groove 61b that extends from a central portion of the first main surface 61 to the outer circumferential annular groove 61a, The orifice member 60 has a plurality of notches 63 arranged along a circumferential direction in the outer peripheral edge of the orifice member 60.

4 Claims, 10 Drawing Sheets

(56) References Cited

U.S. PATENT DOCUMENTS

| | | | |
|---|---|---|---|
| 6,352,487 B1* | 3/2002 | Tada | F01L 1/02 |
| | | | 474/110 |
| 6,435,993 B1* | 8/2002 | Tada | F16H 7/0836 |
| | | | 474/109 |
| 2005/0265856 A1 | 12/2005 | Yoshida | |
| 2013/0337954 A1* | 12/2013 | Bauer | F16H 7/0836 |
| | | | 474/110 |
| 2015/0024886 A1* | 1/2015 | Chekansky | F16H 7/0836 |
| | | | 474/101 |
| 2017/0023107 A1* | 1/2017 | Crump | F16H 7/08 |

FOREIGN PATENT DOCUMENTS

| | | |
|---|---|---|
| JP | 2003-194164 A | 7/2003 |
| JP | 2005-344738 A | 12/2005 |

* cited by examiner

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner for maintaining appropriate tension in a chain or the like. For example, a known chain guide mechanism, which slidably guides a transmission chain, such as an endless roller chain passing over respective sprockets of a crankshaft and of a cam shaft inside an engine room, uses a tensioner to bias a tensioner lever in order to maintain appropriate tension of the chain or the like.

The known tensioner includes a housing having a plunger bore open toward a front side, a plunger slidably inserted in the plunger bore, and a coil spring that biases the plunger toward the front side. In such a tensioner, oil is supplied to an oil pressure chamber formed between the plunger bore and the plunger, so that the plunger is biased toward the front side by the oil in the oil pressure chamber. As the plunger reciprocates, the oil flows through the small gap between the plunger and the plunger bore and the flow resistance provides the damping effect of slowing down the reciprocal movement of the plunger.

It has been known to provide a relief mechanism for discharging the oil inside, the oil pressure chamber to the outside of the plunger when the oil pressure in the oil pressure chamber builds up, so as to maintain the oil pressure of the oil pressure chamber at an appropriate level. In one form of the relief mechanism, as shown in FIG. 8, it is known to provide a relief hole 122 in the plunger 120 to connect the inside and outside of the plunger 120, and to dispose an orifice member 160 inside the plunger 120.

A helical groove 161*b* is formed on an outer circumferential surface of the orifice member 160. The orifice member 160 is press-fitted into a plunger hole 123, and the gap between the inner circumferential surface of the plunger hole 123 and the groove 161*b* is used to adjust the amount of oil to be discharged from the relief hole 122.

In this example shown in FIG. 8, however, since the orifice member 160 is installed inside the plunger hole 123 by press-fitting, the length in the front to back direction (axial direction) of the orifice member 160 needs to be set large so as to secure a press-fitting allowance for the orifice member 160, and the outer diameter of the orifice member 160 and the inner diameter of the plunger hole 123 must be formed with high precision. Moreover, because of the possibility of deformation of the plunger 120 caused by the press-fitting or the orifice member 160, a polishing process is necessary after the assembly. Furthermore, the press-fitting process causes various other problems such as the need for providing press-fitting equipment.

As one possible solution to the problems described above, it has been proposed to provide a disc-like orifice member 160 with an oil groove (not shown) in a first main surface 161 thereof facing a plunger bottom 121 side, such as to be fixedly pressed against the plunger bottom 121 by a coil spring 140 as shown in FIG. 9 (see, for example, Japanese Patent Application Laid-open No. 2003-194164).

In the tensioner of Japanese Patent Application Laid-open No. 2003-194164, when the oil pressure in the oil pressure chamber 111 rises, the oil O inside the oil pressure chamber 111 is discharged to the outside of the plunger 120, traveling through the gap between the outer circumferential surface of the orifice member 160 and the inner circumferential surface of the plunger hole 123, the oil groove in the first main surface 161, and the relief hole 122.

This relief mechanism described in Japanese Patent Application Laid-open No. 2003-194164 also serves as a degassing mechanism for expelling the air A that has entered the oil pressure chamber 111 to the outside of the oil pressure chamber 111. More specifically, the air A that has entered the oil pressure chamber 111 is discharged to the outside of the plunger 120, traveling through the gap between the outer circumferential surface of the orifice member 160 and the inner circumferential surface of the plunger hole 123, the oil groove in the first main surface 161, and the relief hole 122, similarly to the oil O.

SUMMARY OF THE INVENTION

However, in the tensioner of Japanese Patent Application Laid-open No. 2003-194164 the orifice member 160 is fixed by being pressed against the plunger bottom 121 with the coil spring 140, because of which the gap between the inner circumferential surface of the plunger hole 123 and the outer circumferential surface of the orifice member 160 may sometimes become uneven in the circumferential direction as shown in FIG. 10A. When the portion R where the gap is small is located on an upper side in the direction of gravitational force where the trapped air A accumulates as shown in FIG. 9, the trapped air A can hardly be released toward the first main surface 161 of the orifice member 160.

As a possible solution to the problem described above, a notch 163 may be formed to the outer peripheral edge of the orifice member 160 in a portion located on the upper side in the direction of gravitational force as shown in FIG. 10B, so as to allow the trapped air A to be released more easily toward the first main surface 161 of the orifice member 160.

In this case, however, the orifice member 160 must be assembled into the plunger hole 123 such that the notch 163 will be located on the upper side in the direction of gravitational, force, which, leads to the problem of increased, assembling workload. Another problem is that this solution, is not applicable to a tensioner of the type in which the plunger 120 is set inside the plunger bore of the housing 130 in a freely rotatable state.

An object of the present invention is to solve these problems and to provide a simple-structured tensioner that can favorably expel the air that has entered an oil pressure chamber, while enabling a reduction in size and production workload.

The present invention provides a tensioner, including a cylindrical plunger having a plunger bottom on a front end; a housing having a plunger bore that is open toward a front side and accommodates the plunger; a coil spring that is accommodated in an oil pressure chamber formed between the plunger bore and a rear end of the plunger such as to foe able to freely expand and contract and that biases the plunger toward the front side; and a relief mechanism that, releases oil inside the oil pressure chamber to outside of the plunger when oil pressure in the oil pressure chamber rises. The relief mechanism is made up of a relief hole that is open in a central portion on an inner surface of the plunger bottom and connects inside and outside of the plunger, and a disc-like orifice member disposed on the inner surface of the plunger bottom. The orifice member is biased toward the plunger bottom, by the coil spring and includes a first main surface disposed on the plunger bottom and a second main surface opposite from the first main surface. The first main surface is provided with an outer circumferential annular groove formed along an outer peripheral edge of the first main surface and a communication groove that extends from a central portion of the first main surface to the outer circumferential annular groove. The orifice member has a plurality of notches arranged along a circumferential direction in an outer peripheral edge of the orifice member. The problems described above are thereby solved.

According to one aspect of the present invention, the first main surface of the orifice member disposed on the plunger bottom is provided with an outer circumferential annular groove formed along an outer peripheral edge and a communication groove that extends from a central portion of the first main surface to the outer circumferential annular groove, and the orifice member further has notches in an outer peripheral edge thereof. When the oil pressure in the oil pressure chamber builds up, the oil in the oil pressure chamber is discharged to the outside of the plunger through the notches, outer circumferential annular groove, and communication groove of the orifice member, and through the relief hole of the plunger, to maintain the oil pressure of the oil pressure chamber at an appropriate level. That the orifice member does not require a press-fitting process to be installed not only enables the orifice member to be made smaller and its production, workload to be reduced, but also provides the following effects.

That is, because a plurality of notches are formed in the circumferential direction along the outer peripheral edge of the orifice member, the air that may be trapped and accumulate on an upper side in the direction of gravitational force can be released toward the first main surface through one of the plurality of notches. Therefore, the positions of the notches need not be taken into consideration when assembling the orifice member, so that the assembling workload can be reduced. Also, the orifice member can be applied to a tensioner of the type in which the plunger is set inside the plunger bore of the housing in a freely rotatable state.

According to another aspect of the present invention, the plurality of notches are equally spaced along the outer peripheral edge of the orifice member, so that the degassing function is stably achieved irrespective of the orientation of the orifice member inside the plunger hole.

According to yet another aspect of the present invention, the second main surface is provided with a second outer circumferential annular groove formed along an outer peripheral edge of the second main surface, and a second communication groove that extends from a central portion of the second main surface to the second outer circumferential annular groove. When the orifice member is assembled into the plunger hole, there is no need to consider which side of the orifice member should be on top, so that the assembling, workload, can be further reduced. The length of the oil flow passage can be easily adjusted by using a plurality of orifice members laid upon one another.

According to a further aspect of the present invention, a second disc-like orifice member is disposed between the inner surface of the plunger bottom and the orifice member, and the second orifice member includes, in a central portion thereof, a through hole which extends from a first, main surface opposite the plunger bottom through a second main surface opposite the orifice member. The through hole of the second orifice member has a diameter smaller than that of the relief hole. The amount, of oil to be discharged can thus be favorably adjusted with a simple structure.

DESCRIPTION OF THE PREFERRED EMBODIMENTS

A tensioner 10 according to a first embodiment of the present invention will be described with reference to the drawings.

First, the tensioner 10 of this embodiment is incorporated in a chain transmission used in a timing system or the like of a car engine. The tensioner is attached to an engine block to apply appropriate tension to the slack side of a transmission chain passing over a plurality of sprockets via a tensioner lever to reduce vibration during the drive.

Figure 1:
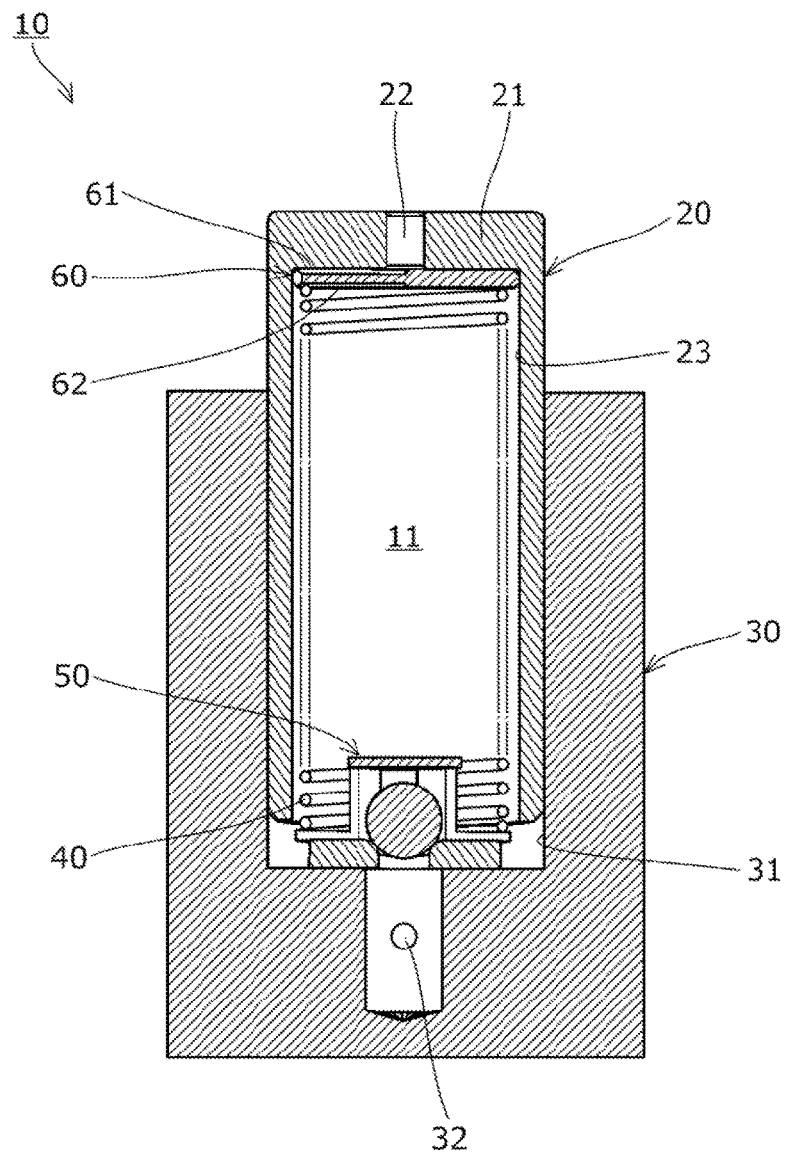
FIG. 1 is a cross-sectional view illustrating a tensioner according to a first embodiment of the present invention.

The tensioner 10 includes, as shown in FIG. 1, a cylindrical plunger 20 having a plunger bottom 21 at a front end, a housing 30 having a plunger bore 31 for accommodating the plunger 20, a coil spring 40 accommodated in an oil pressure chamber 1 formed between the plunger bore 31 and the rear end of the plunger 20 such as to be able to freely expand and contract and to bias the plunger 20 toward a front side, a check valve 50 that prevents the oil from flowing out from the oil pressure chamber 11 while allowing the oil to flow into the oil pressure chamber 11, and a relief mechanism that releases the oil inside the oil pressure chamber 11 to the outside of the plunger 20 when the oil pressure in the oil pressure chamber 11 rises.

Hereinafter, various constituent elements of the tensioner 10 will be described with reference to the drawings.

The plunger 20 is made of metal such as iron or the like and inserted in the plunger bore 31 such as to be able to move back and forth in the front to back direction, as shown in FIG. 1. A relief hole 22 is formed in the plunger bottom 21 such as to open in a central portion of the inner surface of the plunger bottom 21. The plunger 20 has a plunger hole 23 open toward the rear side.

The housing 30 is made of aluminum alloy or synthetic resin and the like and includes, as shown in FIG. 1, the cylindrical plunger bore 31 open toward the front side, and an oil supply hole 32 for supplying oil into the oil pressure chamber 11 from the outside of the housing 30.

The coil spring 40 has one end abutting on an orifice member 60 to be described later and the other end arranged in contact with the bottom of the plunger bore 31, as shown in FIG. 1.

The check valve 50 is disposed between the oil pressure chamber 1 and the oil supply hole 32 as shown in FIG. 1, and allows the oil to flow in from the outside of the housing 30 through the oil supply hole 32 into the oil pressure chamber 11, and prevents the oil from flowing out from the oil pressure chamber 11 through the oil supply hole 32.

The relief mechanism is made up of the relief hole 22 that connects inside and outside of the plunger 20, and the orifice member 60 disposed on the inner surface of the plunger bottom 21, as shown in FIG. 1. The orifice member 60 is biased toward the front side by the coil spring 40 so that it is pressed against the inner surface of the plunger bottom 21 and fixedly held there.

The orifice member 60 is made of metal such as iron or the like or synthetic resin and the like in a disc-like shape, and has a first main surface 61 that is disposed in contact with the inner surface of the plunger bottom 21, and a second main surface 62 on the opposite side from the first main surface 61. The disc-like orifice member 60 has an outer diameter, that is slightly smaller than the inner diameter of the plunger hole 23.

Figure 2:
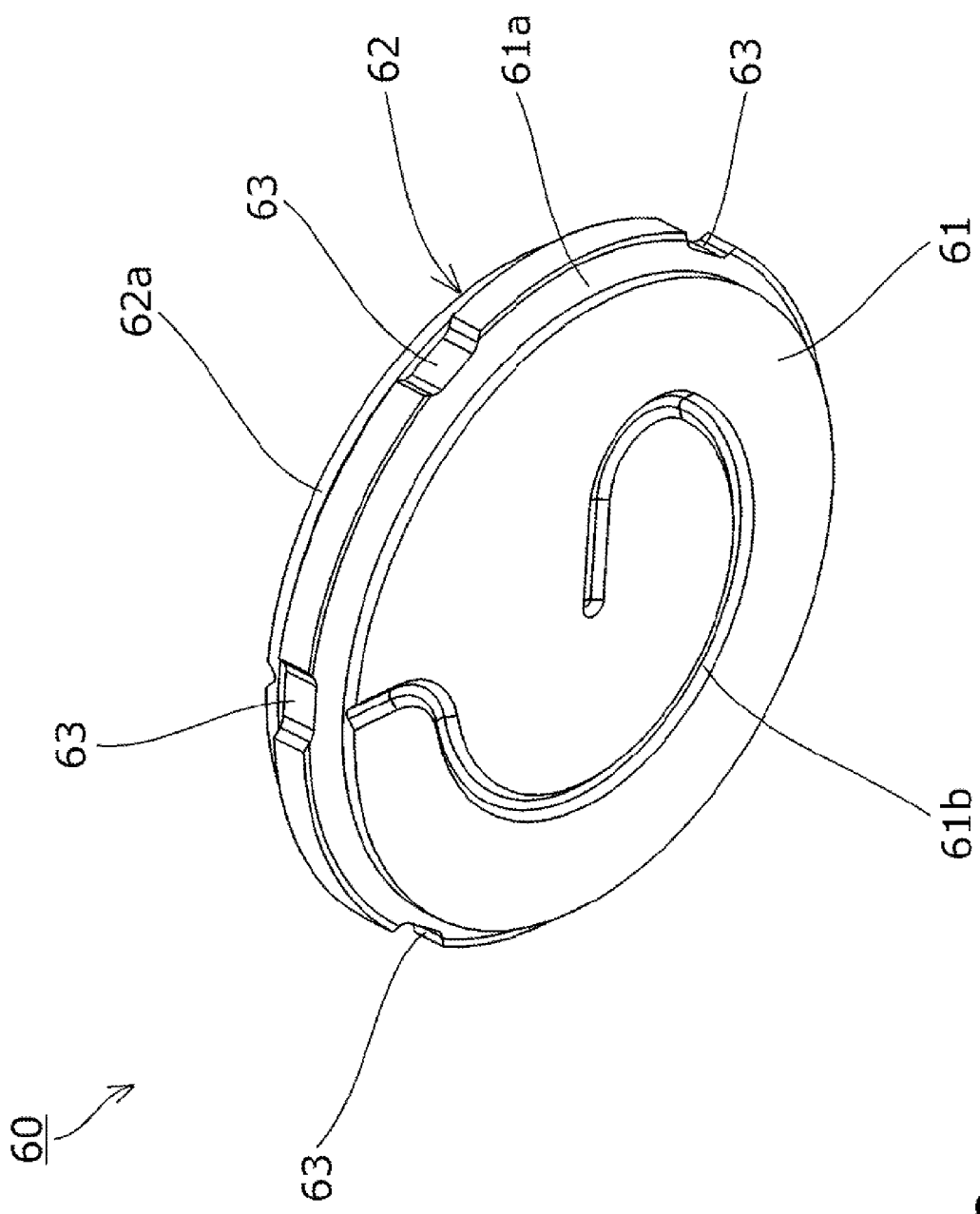
FIG. 2 is a perspective view illustrating an orifice member assembled into the tensioner shown in FIG. 1.
Figure 3:
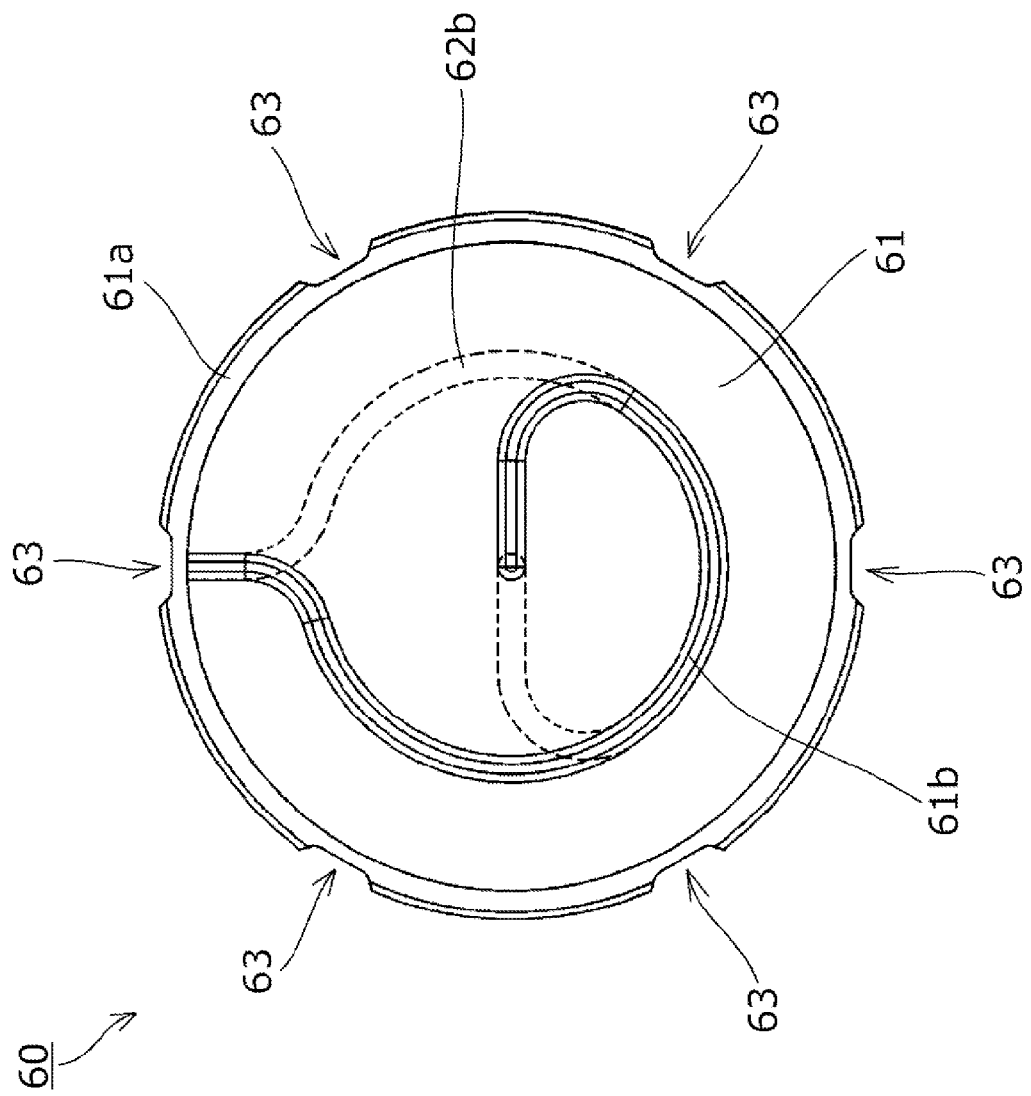
FIG. 3 is a plan view illustrating the orifice member assembled into the tensioner shown in FIG. 1.

The first main surface 61 is provided with a first outer circumferential annular groove 61a formed along an outer peripheral edge of the first main surface 61 and a first communication groove 61b that extends from a central portion of the first main surface 61 to the first outer circumferential annular groove 61a, a shown in FIGS. 2 and 3.

The second main surface 62 is provided with a second outer circumferential annular groove 62a formed along an outer peripheral edge of the second main surface 62 and a second communication groove 62b that extends from a central portion of the second main surface 62 to the second outer circumferential annular groove 62a.

In this embodiment, as shown in FIGS. 2 and 3, the communication grooves 61b and 62b are formed in the main surfaces 61 and 62 in a substantially spiral shape.

Figure 4:
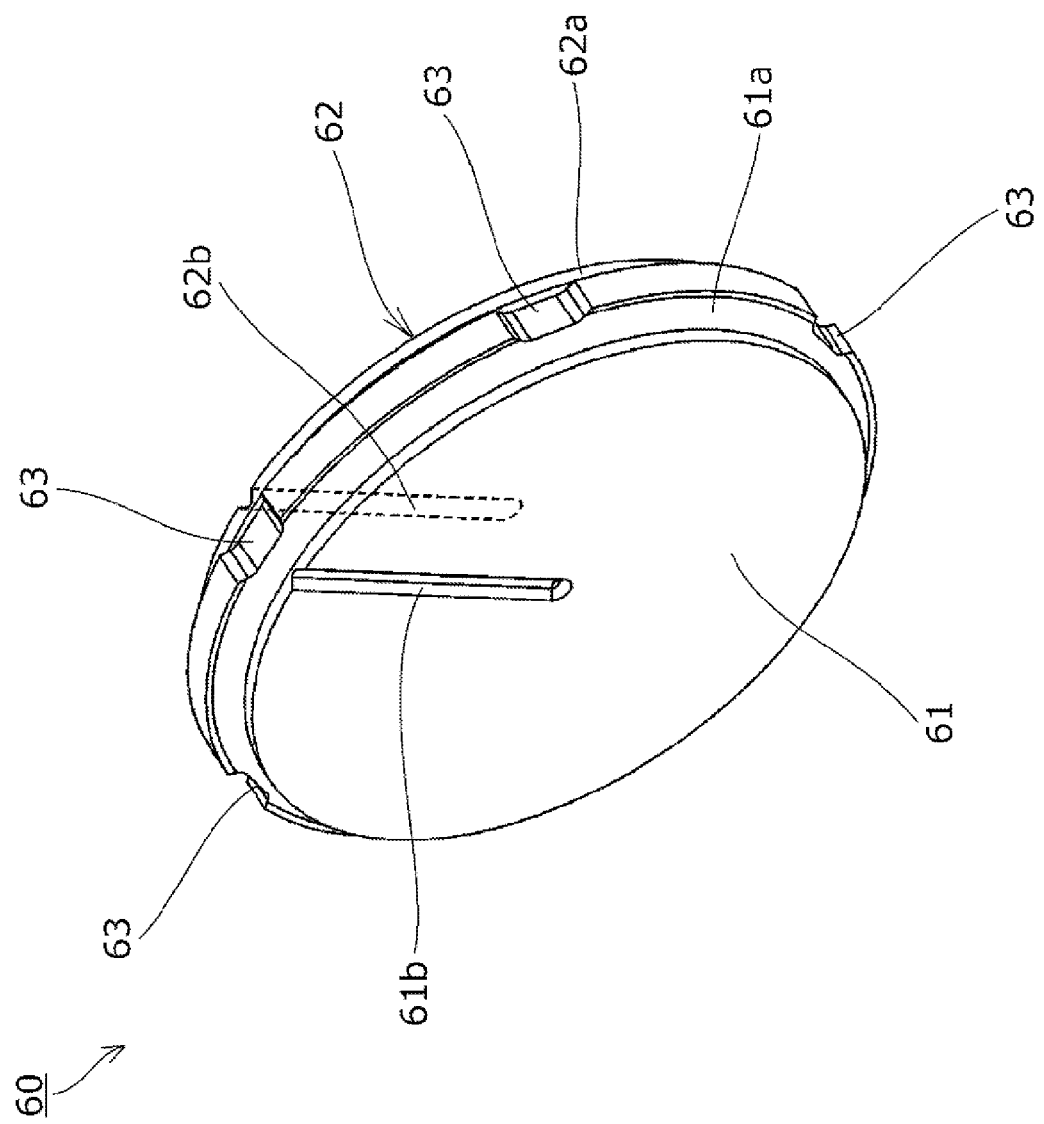
FIG. 4 is a perspective view illustrating a variation example of the orifice member.
Figure 5:
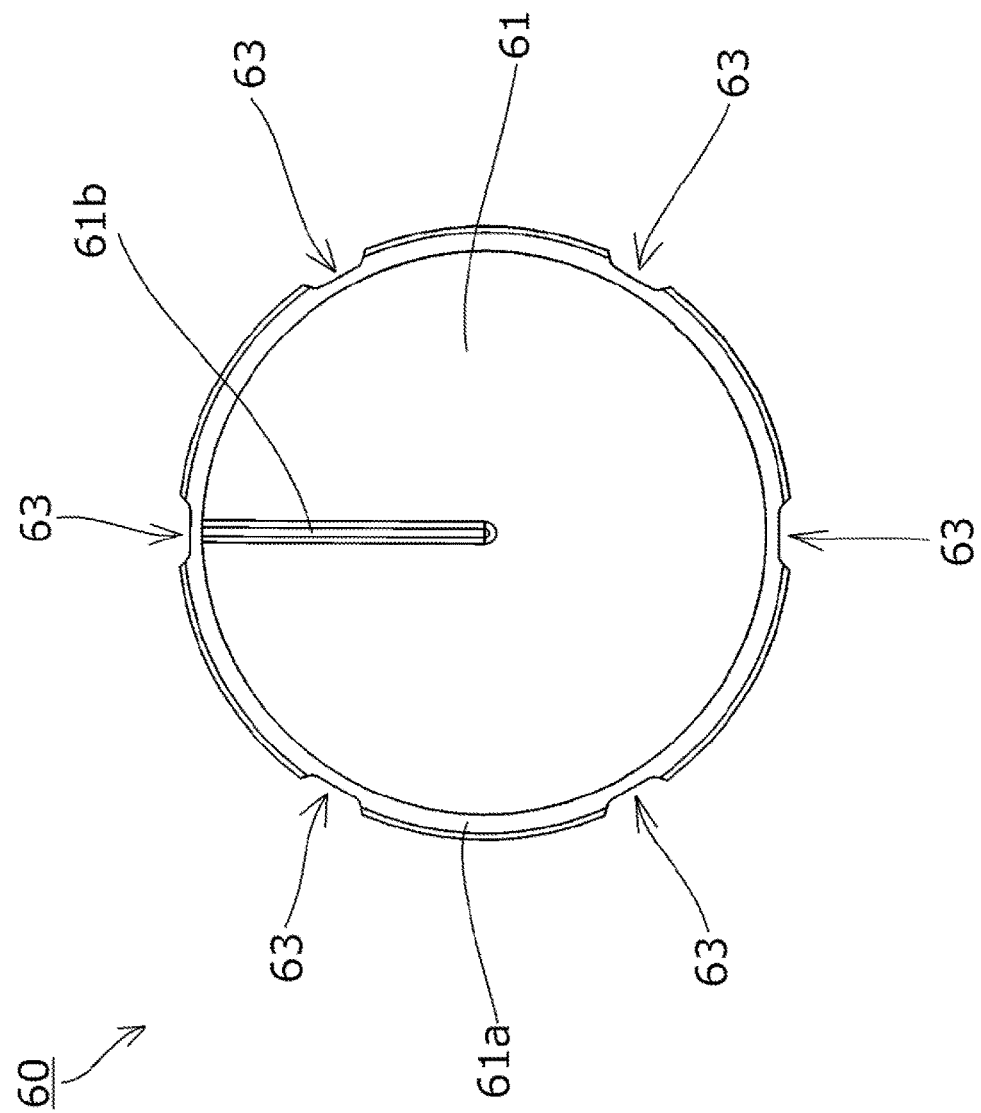
FIG. 5 is a plan view illustrating the: orifice member shown in FIG. 4.

However, the communication grooves 61b and 62b may have any specific shapes as long as they extend from a central portion of the main surfaces 61 and 62 to the outer circumferential annular grooves 61a and 62a. For example, as shown in FIGS. 4 and 5, the communication grooves 61b and 62b may extend straight along the radial direction from the central portion of the main surfaces 61 and 62 to the outer circumferential annular grooves 61a and 62a.

A plurality of circumferentially equally spaced notches 63 are formed along the outer peripheral edge of the orifice member 60, as shown in FIGS. 2 and 3. These notches 63 extend from the first main surface 61 through the second main surface 62 to communicate with the first outer circumferential annular groove 61a and the second outer circumferential annular groove 62a.

In the tensioner 10 of this embodiment thus configured, when the oil pressure in the oil pressure chamber 11 rises, the oil inside the oil pressure chamber 11 is discharged to the outside of the plunger 20, traveling successively through the notches 63, first outer circumferential annular groove 61a, and first, communication groove 61b of the orifice member 60, and through the relief hole 22 of the plunger 20.

When air enters the oil pressure chamber 11, the air is discharged to the outside of the plunger 20 similarly, traveling successively through the notches 63, first outer circumferential annular groove 61a, and first communication groove 61b of the orifice member 60, and through the relief hole 22 of the plunger 20.

Next, a tensioner 10 according to a second embodiment of the present, invention will be described with reference to FIGS. 6 and 7. The second embodiment is, in part, exactly the same as the previously described first embodiment, and therefore its configurations will not be described except for the differences.

Figure 6:
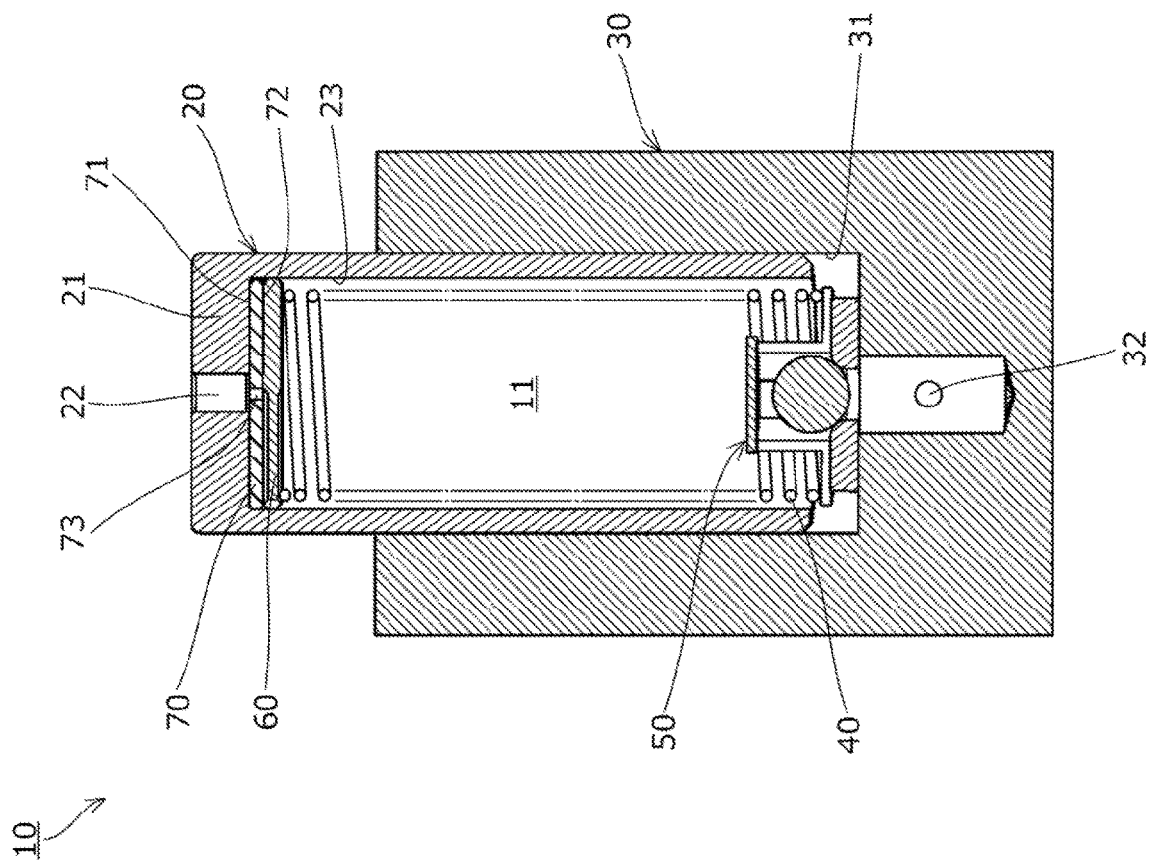
FIG. 6 is a cross-sectional view illustrating a tensioner according to a second embodiment of the present invention.

In the tensioner 10 of the second embodiment, as shown, in FIG. 6, a second disc-like orifice member 70 is disposed, between the inner surface of the plunger bottom 21 and the orifice member 60.

Figure 7:
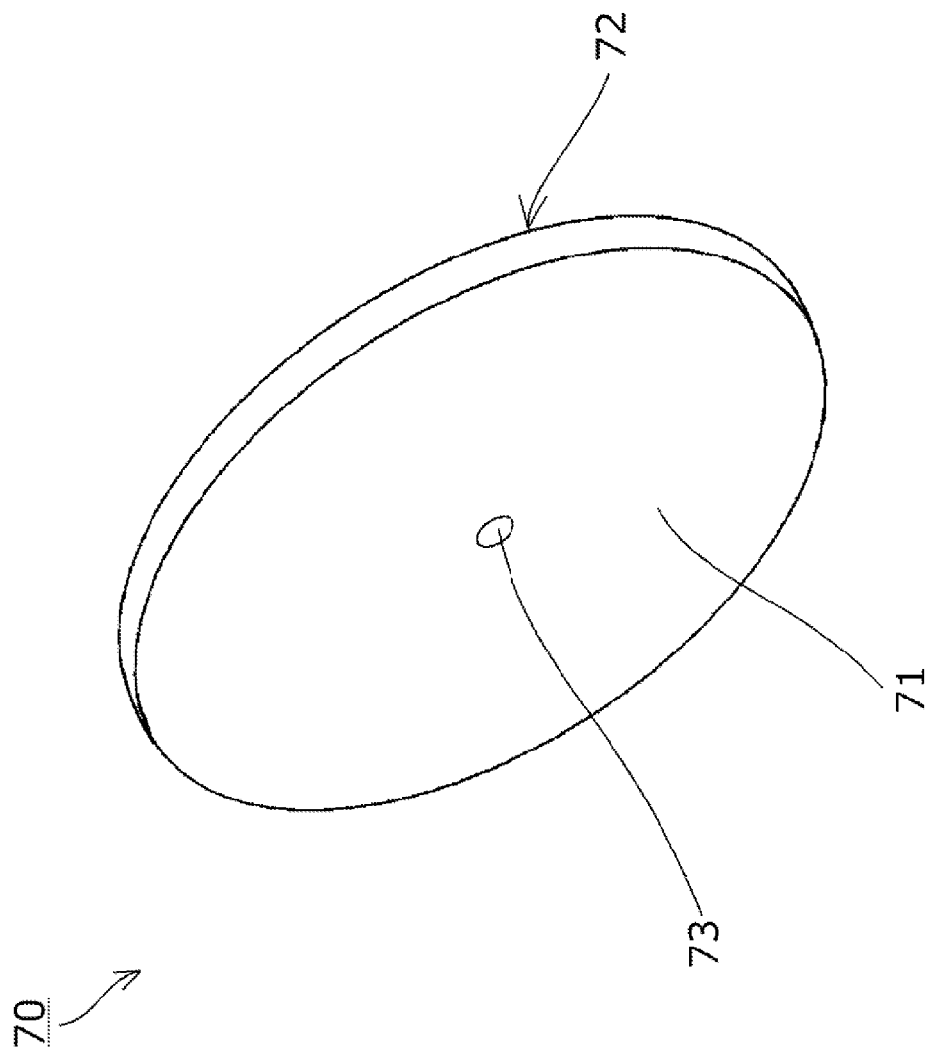
FIG. 7 is a perspective view illustrating a second orifice member assembled into the tensioner shown in FIG. 6.
Figure 8:
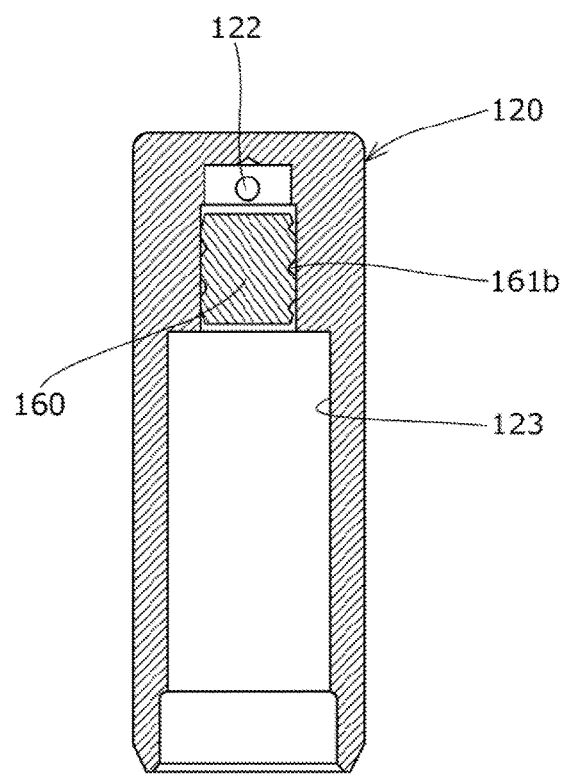
FIG. 8 is a cross-sectional view illustrating an example of a tensioner for reference.
Figure 9:
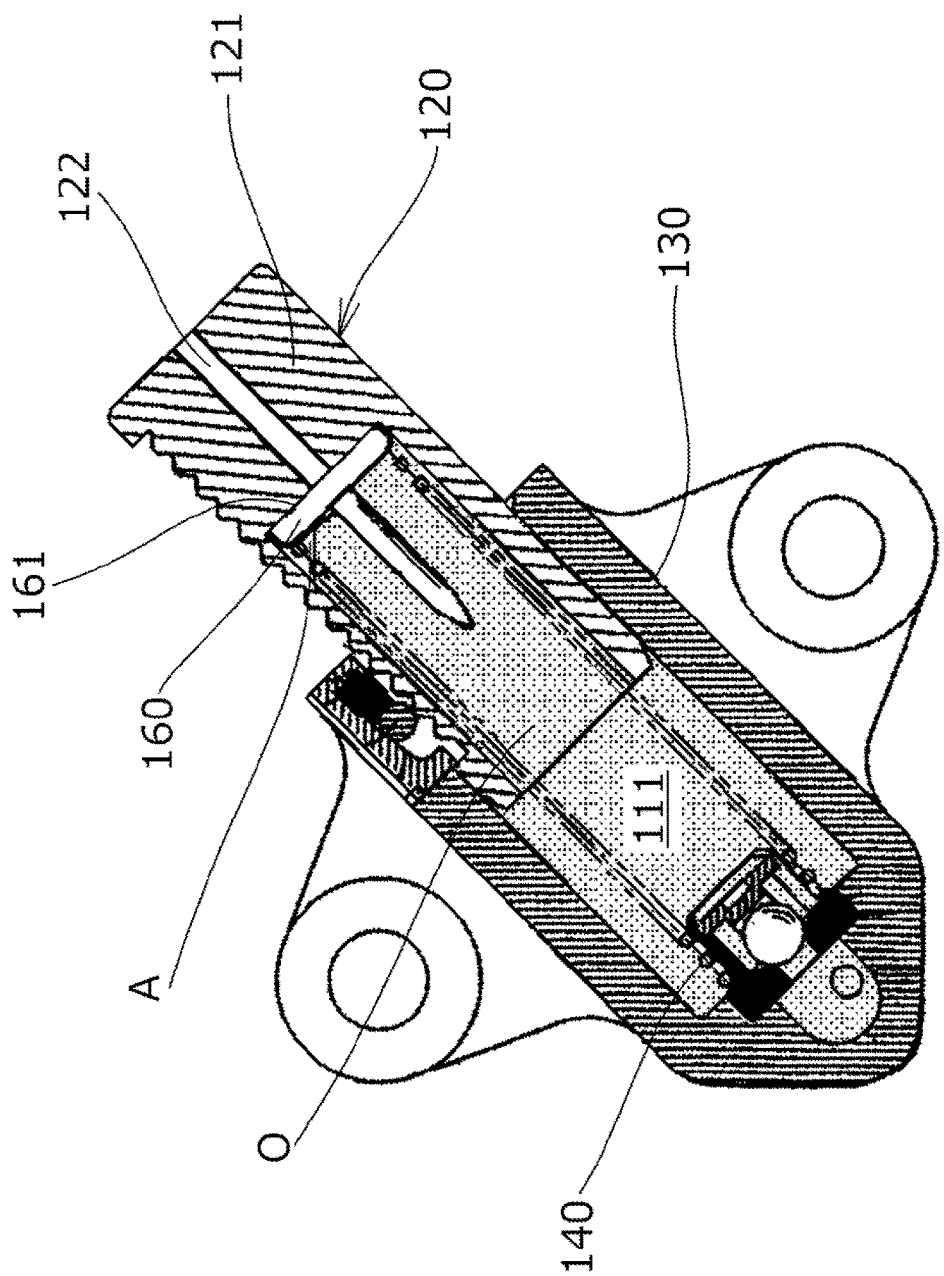
FIG. 9 is a cross-sectional view illustrating a conventional tensioner.
Figure 10:
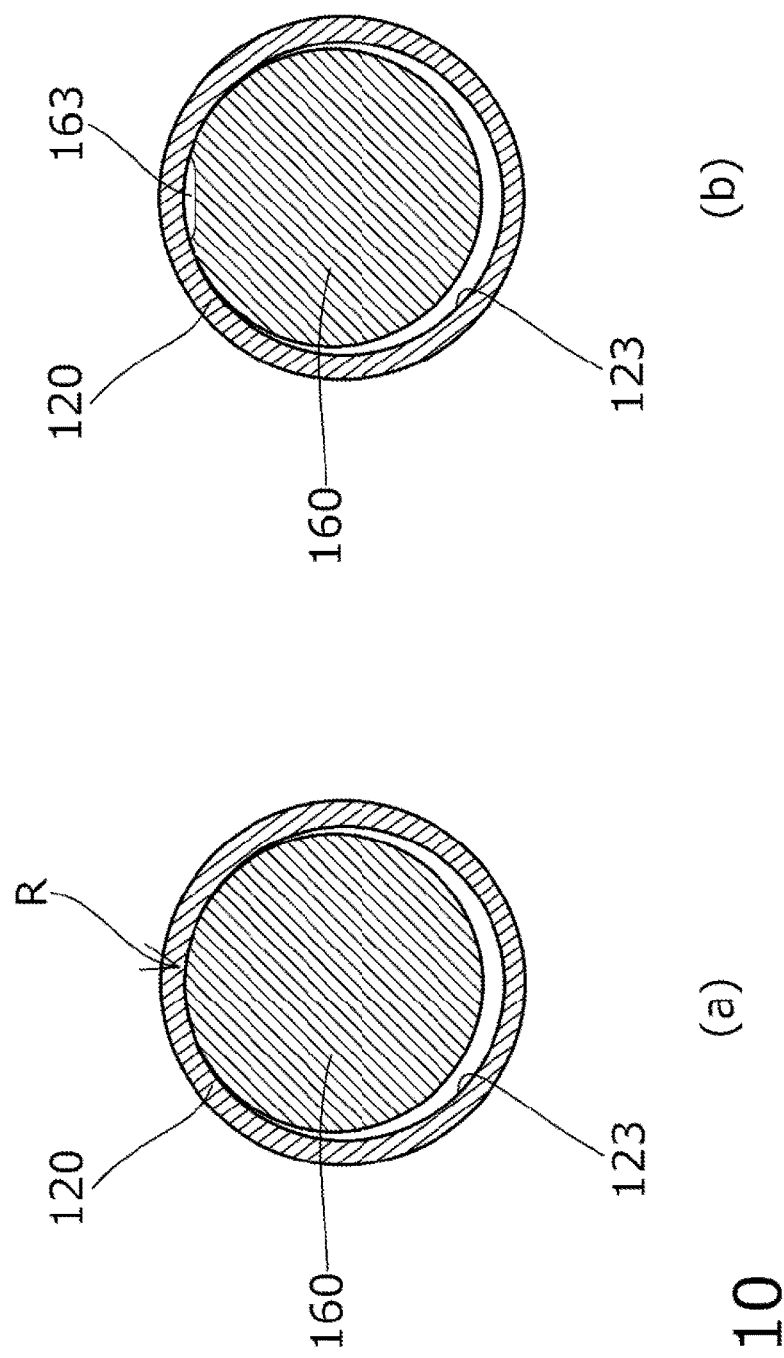
FIGS. 10A and 10B are reference diagrams for describing a gap between the orifice member and the plunger bore.

The second orifice member 170 includes, in a central portion thereof, a through hole 73 which extends from a first main surface 71 opposite the plunger bottom 21 through a second main surface 72 opposite the orifice member 60, as shown in FIGS. 6 and 7. The through hole 73 of the second orifice member 70 is designed to have a diameter that is smaller than that of the relief hole 22.

While the embodiments of the present invention have been described in detail, the present invention is not limited to the above-described embodiments and may be carried out with various design changes without departing from the scope of the present invention set forth in the claims.

For example, various configurations of the embodiments described above may be freely combined to form other tensioners.

While the tensioner was described as a component to be incorporated in a timing system of a car engine in the embodiments above, the purpose of use of the tensioner is not limited to this specific application.

Also, while the tensioner was described as a component that applies tension to a transmission chain with a tensioner lever in the embodiments above, the plunger can directly guide the transmission chain, slidably with a distal end thereof to apply tension to the transmission chain.

The tensioner may not necessarily be applied to a transmission mechanism with a transmission chain but can also foe used for similar transmission mechanisms that use belts, ropes and the like, and can be applied in a variety of industrial fields where it is required to apply tension to an elongated component.

While the housing accommodating the plunger is described as the component known as a housing that, is attached to an engine block or the like in the embodiments described above, the housing is not limited to the specific form described above and may be a cylindrical component known as a sleeve inserted into a body hole formed in the engine body.

While the outer circumferential annular grooves and communication grooves are formed on both first and second main surfaces of the orifice member in the embodiments described above, the outer circumferential annular groove and communication groove may be formed only on the first main surface.

Optionally, two or more orifice members, or the second orifice member, may be disposed one upon another in the front to back direction.

What is claimed is:

1. A tensioner comprising:
   a cylindrical plunger having a plunger bottom on a front end;
   a housing having a plunger bore that is open toward a front side and accommodates the plunger;
   a coil spring that is accommodated in an oil pressure chamber formed between the plunger bore and a rear end of the plunger such as to be able to freely expand and contract and that biases the plunger toward the front side; and
   a relief mechanism that releases oil inside the oil pressure chamber to outside of the plunger when oil pressure in the oil pressure chamber rises,
   the relief mechanism being made up of a relief hole that is open in a central portion on an inner surface of the plunger bottom and connects inside and outside of the plunger, and a disc-like orifice member disposed on the inner surface of the plunger bottom, the orifice member being biased toward the plunger bottom by the coil spring and including a first main surface disposed on the plunger bottom and a second main surface opposite from the first main surface, the first main surface being provided with an outer circumferential annular groove formed along an outer peripheral edge of the first main surface and a communication groove that extends from a central portion of the first main surface to the outer circumferential annular groove, and the orifice member having a plurality of notches arranged along a circumferential direction in an outer peripheral edge of the orifice member.

2. The tensioner according to claim 1, wherein the plurality of notches are equally spaced along the outer peripheral edge of the orifice member.

3. The tensioner according to claim 1, wherein the second main surface is provided with a second outer circumferential annular groove formed along an outer peripheral edge of the second main surface, and a second communication groove that extends from a central portion of the second main surface to the second outer circumferential annular groove.

4. The tensioner according to claim 1, further comprising a second disc-like orifice member disposed between the inner surface of the plunger bottom and the orifice member, wherein the second orifice member includes, in a central portion thereof, a through hole which extends from a first main surface opposite the plunger bottom through a second main surface opposite the orifice member, and the through hole of the second orifice member has a diameter smaller than that of the relief hole.

\* \* \* \* \*